Aug. 7, 1951  R. V. TOWNEND ET AL  2,563,437
PROCESS FOR THE MANUFACTURE OF
SULFUR FROM HYDROGEN SULFIDE
Filed March 24, 1949
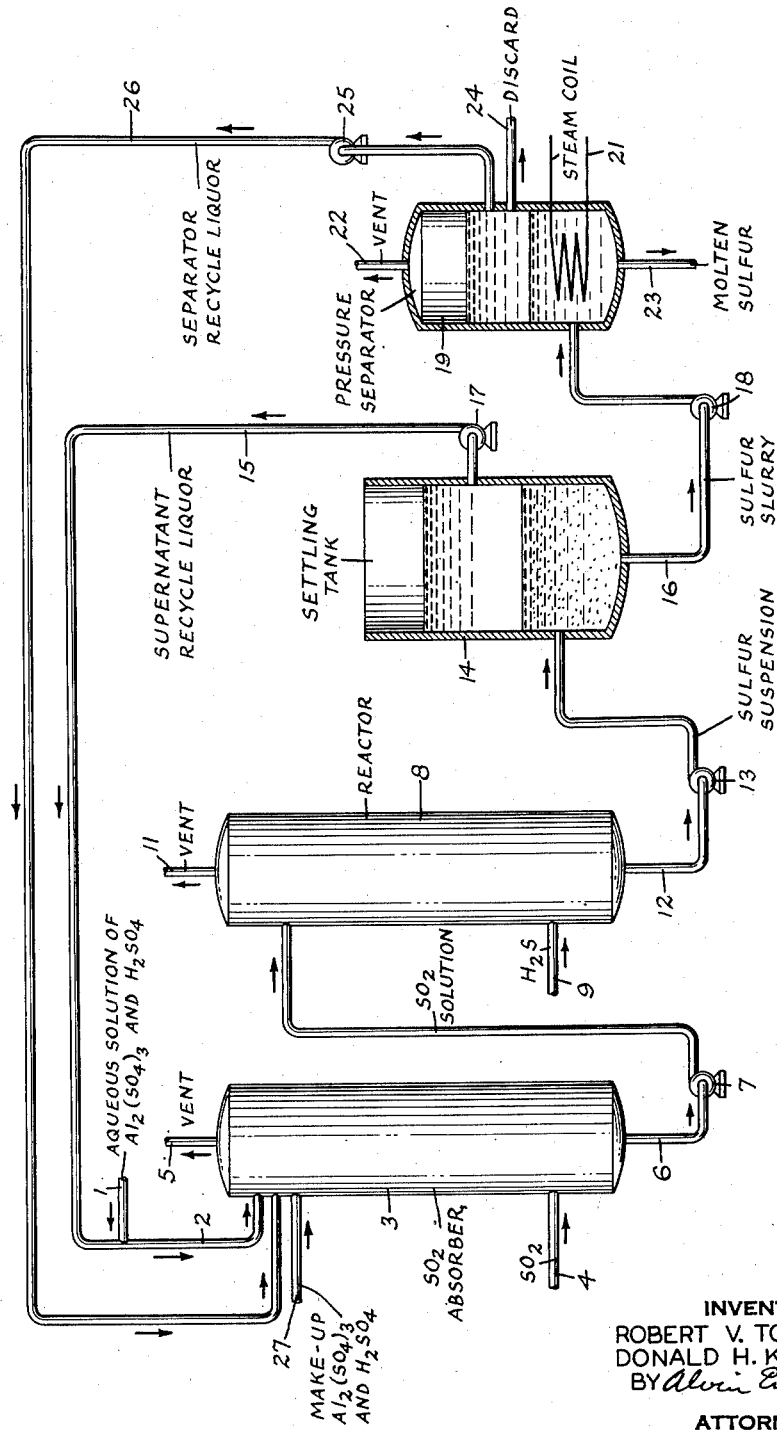
INVENTORS.
ROBERT V. TOWNEND
DONALD H. KELLY
BY Alvin Engelstein
ATTORNEY.

Patented Aug. 7, 1951

2,563,437

UNITED STATES PATENT OFFICE 2,563,437

PROCESS FOR THE MANUFACTURE OF SULFUR FROM HYDROGEN SULFIDE

Robert Vose Townend, Arlington, N. J., and Donald Hoyt Kelly, New Hyde Park, N. Y., assignors to Allied Chemical & Dye Corporation, New York, N. Y., a corporation of New York Application March 24, 1949, Serial No. 83,154

7 Claims. (Cl. 23—225)

This invention relates to the production of elemental sulfur and more particularly refers to a new and improved process for converting hydrogen sulfide and sulfur dioxide into high yields of elemental sulfur.

The pollution of air with noxious gases such as hydrogen sulfide and sulfur dioxide has become an increasing annoyance and health hazard. Furthermore the discharge of sulfur compounds in gaseous form into the atmosphere results in wasteful depletion of natural resources. Although the chemical reaction $$2H_2S + SO_2 \rightarrow 3S + 2H_2O$$

has been known for many decades and investigators have tried various applications of this principle of converting hydrogen sulfide and sulfur dioxide into sulfur, to our knowledge none of the prior art methods have found extensive commercial usage due primarily to inefficient and uneconomical conditions inherent in such processes.

One object of the present invention is to provide an efficient, economical, continuous process for converting hydrogen sulfide and sulfur dioxide into elemental sulfur.

Another object of this invention is to provide an improved process of inhibiting the formation of water-soluble sulfur compounds in a process for converting hydrogen sulfide and sulfur dioxide into elemental sulfur.

A further object of this invention is to provide an improved process of inducing coagulation of precipitated sulfur in a process for converting hydrogen sulfide and sulfur dioxide into elemental sulfur.

Another object of the present invention is to provide an improved method of separating and recovering elemental sulfur from an aqueous sulfur slurry.

Further objects and advantages will be apparent from the following description and accompanying drawing.

We have found that when sulfur dioxide and hydrogen sulfide are reacted in the presence of a water solution containing small amounts of dissolved aluminum sulfate and sulfuric acid, flocculent elemental sulfur which readily settles is produced in high yields, and undesirable by-products such as water-soluble sulfur compounds are largely avoided.

A preferred method of carrying out this portion of our invention involves absorbing sulfur dioxide with a dilute aqueous solution of aluminum sulfate and sulfuric acid in a first tower to produce sulfurous acid and then reacting the sulfurous acid with hydrogen sulfide in a second vessel to produce elemental sulfur. The reaction mixture from the second vessel flows to a settling tank wherein the sulfur readily settles to the bottom in the form of a heavy slurry and supernatent liquor which is largely free from sulfur is withdrawn and recycled for further saturation with sulfur dioxide.

Further, the sulfur slurry containing residual aluminum sulfate solution is heated under pressure to about 120° C. or above to melt the sulfur which forms a lower layer which is withdrawn. Residual liquor from separation of sulfur may be discarded or preferably returned in part to the process.

The production of elemental sulfur based on the reaction between $SO_2$ and $H_2S$ in aqueous solution produces a reaction product consisting of colloidal sulfur, a sulfur suspension of particles approaching colloidal size, together with by-product sulfur compounds, such as polythionic acids. The suspended sulfur is so highly dispersed that it passes through the most retentive filters and the colloidal sulfur gives a yellow true colloidal solution which, from the standpoint of filtration or sedimentation, is the same as a molecular solution. There are at least three difficulties inherent in the conventional prior art processes: (a) formation of excessive amounts of water-soluble sulfur compounds resulting in loss in yield of sulfur, (b) exceedingly slow settling rate of suspended elemental sulfur dispersed in the water and (c) difficulty in separating and recovering elemental sulfur from an aqueous sulfur slurry.

In the course of our experiments we found that when dilute sulfuric acid solutions were used as the medium in which hydrogen sulfide and sulfur dioxide reacted that the formation of water-soluble sulfur compounds was inhibited. However, the sulfur that was produced coagulated much too slowly to be practicable. While small amounts of aluminum sulfate dissolved in water were found to be an effective coagulating agent greatly accelerating the settling of precipitated sulfur, it had no retarding effect on the formation of water-soluble sulfur compounds.

We discovered that a mixture of water having dissolved therein a small amount of sulfuric acid and aluminum sulfate had the cumulative effect of retarding the formation of water-soluble compounds and coagulating precipitated elemental sulfur as it was formed by the reaction between hydrogen sulfide and sulfur dioxide.

We further discovered that separation and recovery of elemental sulfur in almost pure form from the heavy aqueous sulfur slurry could be obtained by heating the slurry in the presence of residual aluminum sulfate under pressure to a temperature of at least 120° C. and withdrawing the molten sulfur separating into a lower layer of the mixture.

From the foregoing it will be apparent that our improved process employing small amounts of aluminum sulfate and sulfuric acid together with elevated temperature and pressure conditions set forth for effecting separation of elemental sulfur from aqueous sulfur slurry accomplishes highly efficient conversion of hydrogen sulfide and sulfur dioxide into practically pure elemental sulfur with a minor amount of undesirable compounds.

The accompanying drawing is a diagrammatic flow diagram illustrating the process of the present invention. Referring to the drawing a dilute aqueous solution of aluminum sulfate and sulfuric acid introduced through lines 1 and 2 into the top of absorber tower 3 passes downwardly countercurrent to a stream of sulfur dioxide gas introduced through line 4 at a point near the bottom of the $SO_2$ absorber 3. The concentration of aluminum sulfate in the aqueous solution entering absorber 3 may range from 0.5% to 5 or more percent by weight, preferably about 2½%, and the concentration of sulfuric acid may be varied from approximately 1 to 5% or more by weight with a preferred content of about 2%.

Sulfur dioxide in varying percentages in gas mixtures from any suitable source may be utilized as one of the reactants. Where $SO_2$ is not available it can be obtained by burning in air approximately ⅓ of the hydrogen sulfide to be reacted. Undissolved gases are vented through line 5 at the top of absorber 3. Any suitable absorbing apparatus may be employed to dissolve the sulfur dioxide gas in the aqueous solution, as for example, a bubble tower or a conventional packed tower. Two or more absorbers may be operated in series with countercurrent flow between the aqueous solution and gas containing sulfur dioxide thereby obtaining more efficient stripping of the sulfur dioxide from the gas. The temperature in absorber 3 is maintained as low as conveniently possible since the vapor pressure of sulfur dioxide increases with higher temperatures resulting in lower concentration of sulfur dioxide in the water solution at the more elevated temperatures. Room temperature, or slightly above, will generally be found most practicable. Absorber 3 can be operated at pressures ranging from atmospheric to high superatmospheric. The sulfur dioxide content in water solution may vary from 0.1% to 5% or more, but preferably is regulated to a concentration of 1–2%.

The water solution containing dissolved sulfur dioxide is withdrawn from the bottom of tower 3 through line 6 and forced by pump 7 into the top of reactor 8, where it comes in contact with hydrogen sulfide entering reactor 8 through line 9 causing precipitation of elemental sulfur. Any form of reaction vessel for effecting intimate contact between the hydrogen sulfide gas and the aqueous $SO_2$ solution may be employed, as for example a packed tower or even an unobstructed vessel containing a body of liquid sulfurous acid into which hydrogen sulfide gas bubbles, aided, if desired, by an agitator for promoting intimate contact between the gas and the liquid. Undissolved non-condensible gases may be released from the top of reactor 8 through vent line 11. Two or more reactors in series may be employed to obtain more complete reaction between the hydrogen sulfide and sulfur dioxide. Higher temperatures tend to accelerate the reaction between sulfur dioxide and hydrogen sulfide, but also decrease the solubility of the gases in the aqueous solution, hence lower temperatures of the order of atmospheric are preferred for carrying out the reaction. The hydrogen sulfide utilized in our process may be byproduct gases from oil refining, natural gas, and similar operations. The concentration of hydrogen sulfide in the gases from these sources varies appreciably; in some instances the gases from these industries are purified by removing the hydrogen sulfide with various agents and then released in substantially pure form. In the practice of our invention 100% hydrogen sulfide may be used as a charging material or gases containing appreciably lower percentages of hydrogen sulfide may be utilized.

The theoretical reaction between sulfur dioxide and hydrogen sulfide is in the proportion of one mol of the former and two mols of the latter. We have found improved results by employing a slight excess of sulfur dioxide, although an excess of hydrogen sulfide or sulfur dioxide does not appreciably impair the operation.

The main reaction between sulfur dioxide and hydrogen sulfide in the aqueous solution results in elemental sulfur in colloidal form and a suspension of particles approaching colloidal form which separates from the solution with great difficulty and is accompanied by side reactions resulting in the formation of water-soluble sulfur compounds, for example polythionates and thiosulfates or their corresponding acids. The presence of small amounts of sulfuric acid in the solution inhibits the formation of these water-soluble sulfur compounds thereby minimizing sulfur losses and increasing the yield of elemental sulfur. The presence of aluminum sulfate in the solution is an effective means of breaking the colloidal solution so that the elemental sulfur content coagulates and settles very rapidly. Indeed, coagulation of the precipitated elemental sulfur occurs as it is formed.

Gassing of the sulfur dioxide aqueous solution with hydrogen sulfide in the reactor 8 is continued until substantially all the sulfur dioxide in solution reacts; a good practical limit being 0.02% $SO_2$ in the aqueous solution.

The reaction mixture consisting primarily of an aqueous solution containing coagulated particles of elemental sulfur passes through line 12, pump 13 into settling tank 14 wherein separation of the mixture into an upper layer of clarified aqueous solution substantially free from sulfur and the lower layer of the heavy slurry containing approximately 25–35% elemental sulfur is accomplished. Pump 13 may be dispensed with if the reactor is operated at a higher pressure than settling tank 14. Ordinarily, settling in tank 14 occurs rapidly due to the presence of aluminum sulfate, and supernatent liquor substantially free from suspended sulfur may be continuously withdrawn through line 15, and a heavy sulfur slurry discharged from the bottom of tank 14 through line 16. In the event a longer settling time may be required two or more settling tanks connected to line 12 in parallel may be operated alternately. A large open tank may be employed for effecting settling of the sulfur suspension unless it is desired to maintain pressure on the entire system in which event a closed tank would be used in lieu of tank 14.

Clarified effluent from the top layer in settling tank 14 is returned by means of pump 17 through lines 15 and 2 into the top of absorber 3 for further scrubbing of the sulfur dioxide from the gases entering tower 3 through line 4. Heavy sulfur slurry withdrawn from the bottom of settling tank 14 through line 16 is introduced by means of pump 18 into pressure separator 19 wherein the mixture is heated under a pressure of 15 pounds gauge or higher to a temperature sufficiently high, 120° C. or higher, to cause the sulfur to melt and separate as a lower layer from the aqueous solution which floats on top of the molten sulfur. The presence of residual aluminum sulfate carried in solution by the heavy sulfur slurry is essential in obtaining coalescence and coagulation of the molten sulfur. The molten sulfur product is in unusually pure state ordinarily containing less than 1% impurities. The upper aqueous solution above the molten sulful contains substantially no suspended elemental sulfur, thereby obtaining a clean separation and eliminating the less efficient and more costly steps of filtration or drying. Pressure saturator 19 is an ordinary pressure vessel in which heat may be applied to the slurry by the use of steam coil 21 as shown in the drawing, or by direct injection of superheated steam or by the interposition of a heating coil in line 16 for elevating the temperature of the sulfur slurry prior to its entrance into pressure separator 19. Pressure on vessel 19 may be regulated by a valve in vent line 22 through which incondensible gases may also be released. The lower layer of molten sulfur in the bottom of separator 19 is drained through line 23.

The interaction of sulfur dioxide and hydrogen sulfide produces substantial quantities of water which would upset the equilibrium of the cyclic system unless provision is made to drain an amount of liquid equivalent to the amount of water produced by the reaction of hydrogen sulfide and sulfur dioxide which we accomplish by withdrawing through line 24 a portion of the liquor which separates on top of the molten sulfur in pressure separator 19. If economy is not too great a factor in the operation the entire upper layer in pressure separator 19 may be discarded, however, we prefer to recycle separated liquor from pressure separator 19 by means of pump 25 through line 26 into $SO_2$ absorber 3 thereby further minimizing losses.

Since a certain amount of aluminum sulfate and sulfuric acid is lost during the operation it becomes necessary to make up this deficiency by the introduction of additional aluminum sulfate and sulfuric acid which may be added in the form of a concentrated solution at any point in the cycle, more conveniently into the top of the $SO_2$ absorber 3 through line 27.

To insure continuity of operation surge tanks, as is common practice in the industry, may be interposed in the system at convenient places.

A specific example for practicing the process in accordance with the present invention is as follows:

9,050 cu. ft. of hydrogen sulfide at standard conditions, equivalent to approximately 0.429 net ton are burned in 118,000 cu. ft. (approximately 4.740 net tons) of gas at standard conditions which by analysis shows 82.4% $N_2$, 9.6% $O_2$ and 8.0% $SO_2$. Upon cooling the gas mixture to 25° C., 0.228 net ton condensed water is discarded.

The gas containing sulfur dioxide is then scrubbed in an absorption tower with 58.800 net tons of a water solution having dissolved therein 2½% by weight aluminum sulfate and 2% by weight sulfuric acid thus producing 59.570 net tons of solution in which about 1.3% $SO_2$ by weight is dissolved. Gases consisting of 4.134 net tons of $N_2$ and $O_2$ and 0.037 net ton $SO_2$ making a total of approximately 104,840 cu. ft. at standard conditions are released from the absorption tower and discharged into the atmosphere.

The 1.3% $SO_2$ aqueous solution is then passed into a reaction chamber wherein 16,900 cu. ft. (0.800 net ton) hydrogen sulfide at standard conditions are introduced in intimate contact with the liquid to effect conversion of the hydrogen sulfide and sulfur dioxide into elemental sulfur. Approximately 78 cu. ft. (0.007 net ton) $SO_2$ at standard conditions escapes from the reaction vessel. The contents of the reaction vessel during the reaction are maintained at a temperature of about 25° C. by indirect heat exchange with cooling water.

The mixture of aqueous solution containing suspended sulfur precipitate discharges into a settling tank wherein it separates into a clarified effluent amounting to 56.293 net tons of an aluminum sulfate and sulfuric acid water solution and a heavy sulfur slurry bottom layer in an amount of 4.070 net tons composed of 75.4% of aluminum sulfate and sulfuric acid water solution and 24.6% precipitated sulfur.

The heavy sulfur slurry is passed into a pressure vessel wherein the mixture is heated under 15 pounds gauge pressure to 120° C. thereby causing precipitated sulfur to melt and form a lower layer equal to one net ton of sulfur which is withdrawn from the system and an upper layer of solution equal to 3.070 net tons.

*Analysis of sulfur product*

|  | Per cent |
|---|---|
| Ash | 0.029 |
| Moisture | 0.205 |
| Sulfur (difference) | 99.766 |

The yield of separated and recovered elemental sulfur from the reaction is about 86.5%, which yield as a result of recycling increases to approximately 92%.

Although certain preferred embodiments of the invention have been disclosed for purpose of illustration it will be evident that various changes and modifications may be made therein without departing from the scope and spirit of the invention.

We claim:

1. A process for the production of elemental sulfur which comprises contacting sulfur dioxide with a dilute aqueous solution of aluminum sulfate and sulfuric acid, whereby an aqueous solution of aluminum sulfate, sulfuric acid and sulfurous acid is formed, and passing hydrogen sulfide through said solution whereby elemental sulfur is produced.

2. A process for the production of elemental sulfur which comprises contacting sulfur dioxide with a dilute aqueous solution containing between 0.5% and 5% aluminum sulfate and between 1% and 5% sulfuric acid, whereby an aqueous solution of aluminum sulfate, sulfuric acid and sulfurous acid is formed, and passing hydrogen sulfide through said solution whereby elemental sulfur is produced.

3. A process for the production of elemental sulfur which comprises contacting sulfur dioxide with a dilute aqueous solution of aluminum sulfate and sulfuric acid, whereby an aqueous solution of aluminum sulfate, sulfuric acid and sulfurous acid is formed, passing hydrogen sulfide through said solution whereby elemental sulfur is produced, permitting the reaction mixture to settle into a supernatant liquor and an aqueous sulfur slurry, and withdrawing the aqueous sulfur slurry.

4. A process for the production of elemental sulfur which comprises contacting sulfur dioxide with a dilute aqueous solution of aluminum sulfate and sulfuric acid, whereby an aqueous solution of aluminum sulfate, sulfuric acid and sulfurous acid is formed, passing hydrogen sulfide through said solution whereby elemental sulfur is produced, permitting the reaction mixture to settle into a supernatant liquor and an aqueous sulfur slurry, recirculating the supernatant liquor for further contact with sulfur dioxide, and withdrawing the aqueous sulfur slurry.

5. A process for the production of elemental sulfur which comprises contacting sulfur dioxide with a dilute aqueous solution of aluminum sulfate and sulfuric acid, whereby an aqueous solution of aluminum sulfate, sulfuric acid and sulfurous acid is formed, passing hydrogen sulfide through said solution whereby elemental sulfur is produced, permitting the reaction mixture to settle into a supernatant liquor and an aqueous sulfur slurry, recirculating the supernatant liquor for further contact with sulfur dioxide, withdrawing the aqueous sulfur slurry, heating the sulfur slurry containing residual aluminum sulfate solution under a pressure of at least 15 p. s. i. to a temperature of at least 120° C. thereby causing the sulfur slurry to separate into an upper layer of liquor and a lower layer of molten elemental sulfur, and withdrawing the molten elemental sulfur.

6. A process for the production of elemental sulfur which comprises contacting sulfur dioxide with a dilute aqueous solution of aluminum sulfate and sulfuric acid, whereby an aqueous solution of aluminum sulfate, sulfuric acid and sulfurous acid is formed, passing hydrogen sulfide through said solution whereby elemental sulfur is produced, permitting the reaction mixture to settle into a supernatant liquor and an aqueous sulfur slurry, recirculating the supernatant liquor for further contact with sulfur dioxide, withdrawing the aqueous sulfur slurry, heating the sulfur slurry containing residual aluminum sulfate solution under a pressure of at least 15 p. s. i. to a temperature of at least 120° C. thereby causing the sulfur slurry to separate into an upper layer of liquor and a lower layer of molten elemental sulfur, discharging a portion of the upper layer from the system, and recirculating the remaining portion of the upper layer for further contact with sulfur dioxide.

7. In a process for the production of elemental sulfur by contacting sulfur dioxide with a dilute aqueous solution of aluminum sulfate and sulfuric acid, whereby an aqueous solution of aluminum sulfate, sulfuric acid and sulfurous acid is formed, and passing hydrogen sulfide through said solution whereby elemental sulfur is produced, the improvement which comprises permitting the reaction mixture to settle into a supernatant liquor and an aqueous sulfur slurry, withdrawing the aqueous sulfur slurry, heating the sulfur slurry containing residual aluminum sulfate solution under a pressure of at least 15 p. s. i. to a temperature of at least 120° C. thereby causing the sulfur to form a lower layer of molten elemental sulfur, and withdrawing the molten sulfur.

ROBERT VOSE TOWNEND.
DONALD HOYT KELLY.

REFERENCES CITED

The following references are of record in the file of this patent:

UNITED STATES PATENTS

| Number | Name | Date |
|---|---|---|
| 1,083,249 | Hall | Dec. 30, 1913 |
| 1,925,198 | Milvill | Sept. 5, 1933 |
| 1,995,545 | Leahy | Mar. 26, 1935 |